No. 613,527. Patented Nov. 1, 1898.
A. RICHMOND.
SIDE BEARING FOR RAILWAY CARS.
(Application filed Oct. 20, 1897.)

(No Model.)

Witnesses
Wm. Nelson
A. L. Clark

Inventor
Alexander Richmond.
per
Jno. Zimmerman.
Atty.

THE NORRIS PETERS CO., PHOTO-LITHO., WASHINGTON, D. C.

UNITED STATES PATENT OFFICE.

ALEXANDER RICHMOND, OF CHICAGO, ILLINOIS.

SIDE BEARING FOR RAILWAY-CARS.

SPECIFICATION forming part of Letters Patent No. 613,527, dated November 1, 1898.

Application filed October 20, 1897. Serial No. 655,848. (No model.)

*To all whom it may concern:*

Be it known that I, ALEXANDER RICHMOND, a citizen of the United States, residing at Chicago, in the county of Cook and State of Illinois, have invented certain new and useful Improvements in Side Bearings for Railroad-Cars, which are fully set forth in the following specification, reference being had to the accompanying drawings, forming a part thereof, and in which—

Figure 1:
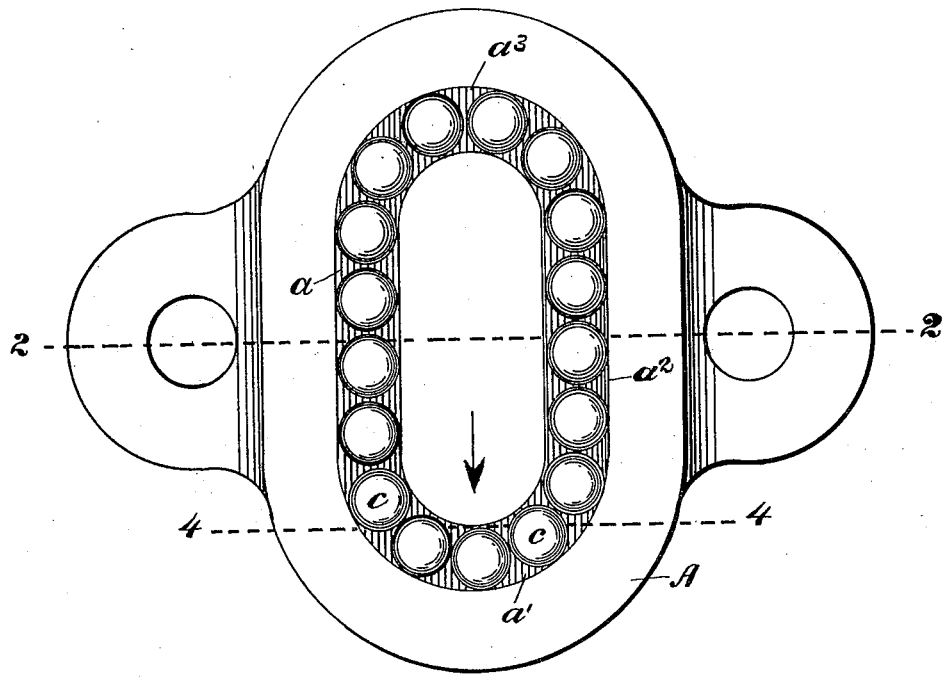
Figures 2, 3:
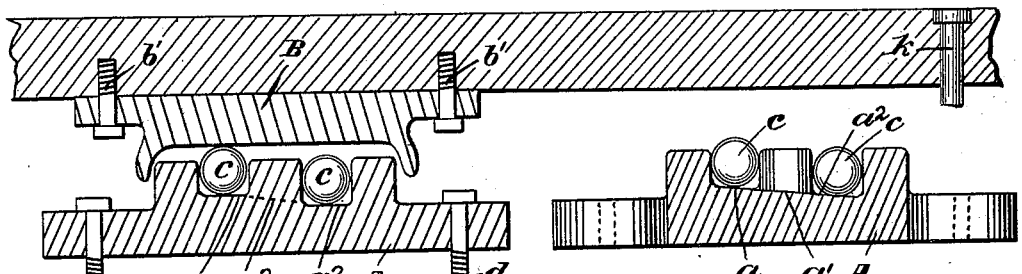

Figure 1 shows the lower part of my said device in plan view. Fig. 2 shows a transverse vertical section on the plane 2 2, Fig. 1. Fig. 3 shows a transverse vertical section on plane 4 4, Fig. 1.

Like letters of reference denote like parts.

The object of my invention is to produce a side bearing for car-bodies and like uses of unlimited range of motion and of greatest freedom of action. To attain said desirable ends, I construct my said new device in substantially the following manner, namely:

I make a plate A with lugs through which pass bolts $d$ to fasten to the truck-bolster. In said plate is an endless channel with sides slightly curved or concentric with the king-bolt $k$ and rounded ends connecting said sides. One of the longitudinal parts of said channel, preferably the outer one, has a bottom somewhat higher than its opposite counterpart, as plainly indicated in Fig. 2. The connecting ends of said channels have inclined bottoms, as indicated in Figs. 2 and 3, connecting the higher with the lower of said channels at their ends. Said channel is of uniform width and holds a series of like-diametered steel balls $c$, fitting closely but loosely said entire channel. To the body-bolster or transom-bar is attached a plate B, having lugs through which pass fastening-bolts $b'$. The plate B rests on the series of balls $c$ in the higher channel, thus leaving the balls in the lower channel and the inclined connecting-channels free. When the plate B moves on the balls $c$ in the direction indicated by the arrow, said balls will roll out from the forward end of the channel $a$ into the front inclined channel $a'$ and thence into the channel $a^2$, pushing all the loose balls before them, and thus pushing the balls up the rear inclined channel $a^3$ against the plate B, whereat by said motion they are forced into the channel $a$, where they bear their proportion of the burden of all the balls in the channel $a$. The motion in the direction indicated or the reverse may be endless. The bearings will always be as free from friction and as perfect at one time as another continuously.

In my illustration five or six balls are shown as burden-bearers; but in proportion as the channel is more and more curved into a circle and not concentric with the king-bolt until finally it is circular fewer balls can be made to work together to best advantage until, when in said last condition, only one ball can really do good service, and then there can be but a short high channel for its use.

What I claim is—

The combination with a king-bolt and thereto axially-transverse borne plate, of a bearing-plate parallel to said borne plate provided with an endless channel divided into four parts whereof one part is above and the other below a plane transverse to said king-bolt axis and inclined connecting-channels at both ends of said superposed channels and a series of uniform-sized balls bearing the load in said upper channel, and free from said duty in said lower and end channels, substantially as specified.

ALEXANDER RICHMOND.

Witnesses:
WM. ZIMMERMAN,
P. H. HOLLAND.